United States Patent
Shah et al.

(10) Patent No.: US 12,373,749 B2
(45) Date of Patent: Jul. 29, 2025

(54) MANAGING TELECOMMUNICATION RESPONSIVENESS

(71) Applicant: Indeed, Inc., Austin, TX (US)

(72) Inventors: Devansh T. Shah, Vadodara (IN); Rahul Dhaundiyal, Hyderabad (IN)

(73) Assignee: Indeed, Inc., Austin, TX (US)

( * ) Notice: Subject to any disclaimer, the term of this patent is extended or adjusted under 35 U.S.C. 154(b) by 325 days.

(21) Appl. No.: 17/818,851

(22) Filed: Aug. 10, 2022

(65) Prior Publication Data
US 2024/0054416 A1    Feb. 15, 2024

(51) Int. Cl.
*G06Q 10/0631* (2023.01)
*G06Q 10/0639* (2023.01)
*G06Q 10/1053* (2023.01)
*H04L 12/18* (2006.01)

(52) U.S. Cl.
CPC . *G06Q 10/063114* (2013.01); *G06Q 10/0639* (2013.01); *G06Q 10/1053* (2013.01); *H04L 12/1831* (2013.01)

(58) Field of Classification Search
CPC ....... G06Q 10/0639; G06Q 10/063114; G06Q 10/1053
See application file for complete search history.

(56) References Cited

U.S. PATENT DOCUMENTS

| | | | |
|---|---|---|---|
| 12,093,898 B2* | 9/2024 | Leslie | G06Q 10/1053 |
| 2014/0214530 A1* | 7/2014 | Duva | G06Q 30/0246 |
| | | | 705/14.45 |
| 2021/0097493 A1* | 4/2021 | Li | G06Q 10/1053 |

OTHER PUBLICATIONS

A. Capiluppi and A. Baravalle, "Matching demand and offer in on-line provision: A longitudinal study of monster.com," 2010 12th IEEE International Symposium on Web Systems Evolution (WSE), Timisoara, Romania, 2010, pp. 13-21. (Year: 2010).*

* cited by examiner

*Primary Examiner* — Stephanie Z Delich
(74) *Attorney, Agent, or Firm* — Young Basile Hanlon & MacFarlane, P.C.

(57) ABSTRACT

A telecommunication responsiveness system and method receives a job posting regarding an available job from a job provider including a telecommunication address of a job provider representative, associates and substitutes a virtual telecommunication address for the telecommunication address in the job available posting. The system and method then route any subsequent telecommunications from a job seeker through a communication tracking system of a job search intermediary to the job provider representative, allowing the job search intermediary to track and generate metrics for job provider communication responsiveness.

21 Claims, 9 Drawing Sheets

MANAGING TELECOMMUNICATION RESPONSIVENESS

BACKGROUND

Technical Field

A system and method relate generally to managing telecommunication responsiveness, and more specifically to a computer implemented method and system for managing telecommunication responsiveness by implementing and managing a use of virtual telecommunication addresses for telecommunications.

Description of Related Art

Traditionally, employers or other job providers seeking to fill a job for a business post information about the job to seek job applicants, accept applications for the job from job seekers, review the applications to determine qualifications and suitability for the job, interview the qualified job seekers, then make a hiring decision. The job may be posted on the business's website, on social media, on job bulletin boards, through the use of recruiters, and/or simply by posting a help wanted sign on a window of the business. The applications submitted by the job seekers may be forms provided by the employer, may include a resume of the job seeker, or the job seeker may simply respond in person to a help wanted sign at the business. The job provider can then perform an initial evaluation of each job seeker's qualifications and suitability for the job and workplace based on the application and resume. The job provider may then interview the qualified job seekers to further determine the qualifications and suitability of each job seeker and to compare the job seekers for a best fit. These interviews may be in person, by video conference, by teleconference, or other means of two-way communications. The job seeker also has the opportunity in this interview process to determine whether the job provider and job are a good personal fit. After this interview process, the job provider can then make a hiring decision and provide a job offer to the preferred job seeker(s).

Alternatively, employers or other job providers as well as job seekers may utilize the services of a job search intermediary. That is, a job search intermediary may accept job postings of available jobs from multiple job providers as well as register and obtain resumes from multiple job seekers. The job search intermediary may then perform a variety of matching functions between job providers and job seekers. For example, upon receiving a search query of from a job seeker, the job search intermediary may provide a ranked set of job postings from job providers to the job seeker. These job postings may be ranked according to a variety of factors including correlations between the job seeker's resume and qualifications listing in the job postings. Upon the user selecting a job posting, the job seeker may review details of the job posting. Upon further inquiry from the job seeker, contact information regarding the job provider may be provided to the job seeker. The job seeker may then utilize the provided contact information to directly contact the job provider with any questions regarding the available job. The job seeker may then apply for the job, either through the job search intermediary or directly with the job provider.

SUMMARY

In an embodiment, a telecommunication responsiveness system and method receives a job posting regarding an available job from a job provider including a telecommunication address of a job provider representative, associates and substitutes a virtual telecommunication address for the telecommunication address in the job available posting, then routes any subsequent telecommunications from a job seeker through a communication tracking system of a job search intermediary to the job provider representative, allowing the job search intermediary to track and generate metrics for job provider communication responsiveness. More specifically, in the embodiment, upon a job provider posting an available job, the job posting may include a first telecommunication address for job seekers to contact a representative of the job provider regarding the available posted job. A job search intermediary may substitute and associate a virtual telecommunication address for the first telecommunication address in the job posting. Any subsequent telecommunications to the virtual telecommunication address by job seekers, such as in response to the job posting, are automatically received by a communication tracking system of the job search intermediary. Upon detecting the telecommunication from the job seeker to the virtual telecommunication address, the communication tracking system routes the job seeker telecommunication to the associated first telecommunications address of the job provider representative while tracking certain metrics of the telecommunication. These tracked metrics of the telecommunication may include the success and duration of the call, which are utilized to determine a responsiveness rating of the job provider.

BRIEF DESCRIPTION OF THE DRAWINGS

Embodiments of a system and method for enabling telecommunications including generating metrics of job provider responsiveness to subsequent job seeker calls to the job provider may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
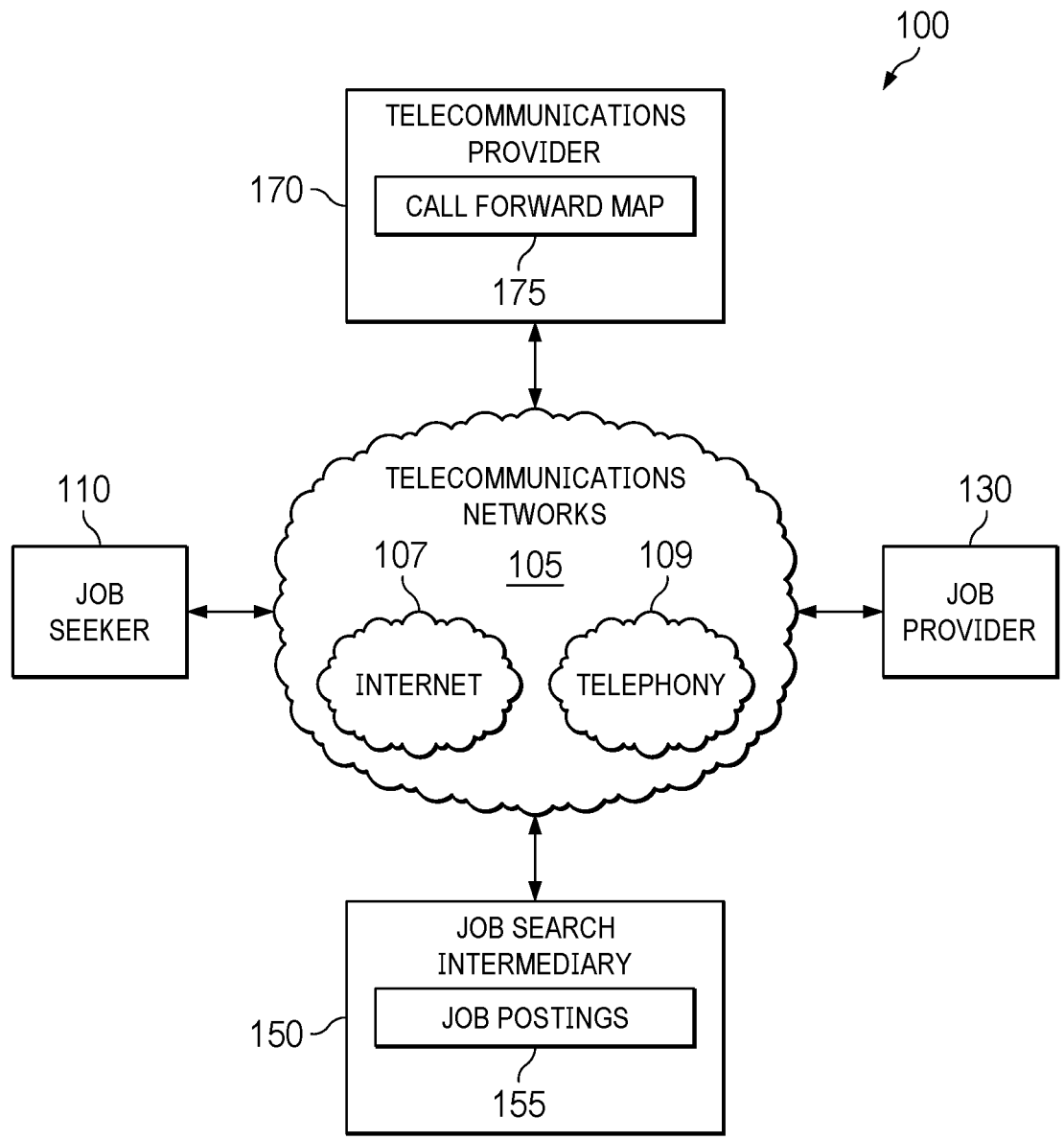
FIG. 1 depicts a high level block diagram of a system for enabling telecommunications regarding posted jobs between job providers and job seekers including generating metrics of job provider responsiveness to subsequent job seeker calls to that job provider, in which various embodiments of the present disclosure may be implemented.

A telecommunication responsiveness system and method enables communications regarding posted jobs between job providers and job seekers including generating metrics of job provider responsiveness to job seeker calls to the job provider. Telecommunication responsiveness presents several technical challenges that the system and method address. When job seekers respond to a job posting, responsiveness of the job provider to the job seekers represents a fundamental metric in engaging job seekers with a job provider. The more responsive a job provider is the more likely that a job seeker will maintain interest in the job provided by the job provider and interest in the particular job search intermediary through which the job is posted. However, tracking responsiveness of a job provider to telecommunications from a job seeker presents a technical challenge. Conventionally, once a job seeker is provided telecommunication contact information for a job provider, unlike other forms of communication, such as electronic mail where multiple parties can be copied on communications, the job search intermediary is no longer in a telecommunication loop between the job seeker and the job provider. Thus, to track job provider telecommunication responsiveness, conventionally the job search intermediary relied upon the job seeker to contact the job search intermediary and self-report the job provider's responsiveness, or the job search intermediary followed-up and contacted the job seeker to track the responsiveness. Both of these tracking mechanisms are time consuming and can be unreliable because, for example, the job seeker may not take time to self-report responsiveness and/or the job search intermediary may be unable to get in contact with the job seeker. The telecommunication responsiveness system and method provide a technical solution that resolves job provider communication responsiveness. In general, the telecommunication responsiveness system and method utilize virtual telecommunication address that route through a communication tracking system that allows the job search intermediary to track and generate metrics for job provider communication responsiveness.

As discussed above, a job search intermediary, also referred to herein as a job search service provider, provides contact information of a job provider regarding a job posting to job seekers. When the job seeker uses telecommunication to contact the job provider the job search intermediary may lose visibility into the ongoing interactions between the job seeker and the job provider. This visibility may be useful in identifying whether the job provider is responsive to a job seeker inquiry. Such information regarding job provider responsiveness may be useful in notifying other job seekers of such responsiveness and in ranking job postings provided to other job seekers. For example, job postings by job providers that are more responsive may receive a higher ranking by the job search intermediary because the more responsive and, thus, higher ranked job providers are more likely to maintain engagement with job seekers and ultimately hire a job seeker.

When a job provider sends a set of job postings regarding available jobs to a job search intermediary, the job postings may include one or more telecommunication addresses for job seekers to telephonically contact (i.e., call) a job provider representative. The telecommunication responsiveness system and method interact with a telecommunications provider to substitute a virtual telecommunication address for each contact telecommunication address in the job postings. Subsequently, when the job search intermediary provides a job posting to one or more job seekers, the job postings will include the virtual telecommunication address of the job provider representative. The telecommunication responsiveness system and method tracks assignment of each virtual telecommunication address and monitors subsequent calls to that virtual telecommunications address for forwarding such subsequent calls to the telecommunications address of the job provider representative and for generating certain metrics. That is, upon a job seeker using the virtual telecommunication address to call the job provider representative, the telecommunications provider detects and forwards the call to the job provider representative while detecting and storing certain call metrics such as call status and duration. These call metrics may then be forwarded to the job search intermediary to calculate a job provider responsiveness rating. This rating may then be utilized by the job search intermediary to rank job postings and to provide the rating in response to subsequent job seeker inquires.

The description of the telecommunication responsiveness system and method herein utilizes examples from a job search intermediary providing communications with and between job providers and job seekers to further enable others of ordinary skill in the art to understand the embodiments disclosed herein. The telecommunication responsiveness system and method, including modifications and variations thereof, may be utilized in other hosted communication environments as will be apparent to those of ordinary skill in the art without departing from the scope and spirit of the described embodiments.

Telecommunication refers to the transmission of voice information over a distance between people utilizing voice communication devices in separate locations. These telecommunications, also referred to herein as a call, may be established across a telephonic network, the internet, or across other networks. A telephonic network, also referred to herein as a telephony network, is a telecommunications network that traditionally connects voice calling devices, such as regular telephones, smart phones, computers, and other devices that operate across an analog and/or digital network. Telecommunications may be established across a variety of mediums and provider networks including the Internet as VOIP (voice over internet protocol) through the use of packets of digital information, through wireless cellular or satellite based networks, through conventional analog or digital-analog wired networks, and so on. Other types of telecommunications may include live video conferences across the internet or other networks. Telephonic devices may be telephones, mobile phones, tablets, personal computers, and a variety of other electronic devices which may receive, transmit and provide live voice communications. Telecommunications may utilize a telecommunication address to establish a telephony connection. The telecommunication address may be numeric, such as a phone number, alphanumeric data, an internet address, or other addressing scheme. Such telecommunication addresses may be location specific (e.g., a landline to a home address), device specific (e.g., a mobile phone), personal account specific (e.g., an email address), or even a mutual internet address for a virtual meeting place online (e.g., a video conference web address). Some of these telecommunication addresses may require a user to log in with a user identifier and/or a password or other security measures. As may be appreciated by one of ordinary skill in the art, various embodiments may utilize various types of networks and types of telecommunication addresses to establish telecommunications with telephonic devices of other persons as described herein.

FIG. 1 depicts a high level block diagram of a telecommunication system 100 for enabling telecommunications regarding posted jobs between job providers and job seekers including generating metrics of job provider responsiveness to subsequent job seeker calls to that job provider, in which various embodiments of the present disclosure may be implemented. Additional details regarding this system is provided below with reference to other Figures.

Telecommunications system 100 includes a job seeker 110, a job provider 130 and a job search service provider 150 communicating with each other across telecommunications networks 105. Those communications may be enabled by telecommunications provider(s) 170. Although job seeker 110, job provider 130, job search intermediary 150 and telecommunications provider 170 are shown in the singular, each may include many other such seekers and providers. Telecommunications networks 105 may include internet 107, telephony network 109, and other networks which may be available for persons and entities to communicate with each other. Traditionally, telephony network 109 is analog based and internet 107 is digital based, although bridges between these networks have been established enabling telecommunications to occur through a variety of pathways and devices.

Job seeker 110 may be one or more job seekers utilizing telecommunications devices to seek employment with one or more job providers 130 across internet 107. In doing so, job seeker 110 may utilize job search intermediary 150 to search and view job postings from multiple such job providers. Job search intermediary 150 may maintain a set of job postings from job providers 130 in a job posting database 155. Each such job posting may include contact information of the job provider, either in the job posting or in response to a query from job seeker 110. This job provider contact information may include a telephone number or other telecommunication address for job seeker 110 to call a representative of job provider 130 for a live electronic voice communication. Such a telecommunication may utilize the services of one or more telecommunication providers 170. For example, job seeker 110 may utilize a mobile phone that utilizes the cellular network of a first telecommunications provider and job provider 130 may utilize a landline that utilizes the landline network of a second telecommunications provider 130.

As explaining in greater detail below, prior to providing a job posting from job provider 130 to job seeker 110, job search intermediary 150 (also referred to herein as a job search service provider) may identify and replace a contact telecommunication address from the job provider contact information with a virtual telecommunication address (e.g., a virtual phone number). This virtual telecommunication address may be obtained by job search intermediary 150 from telecommunications provider 170, which also associates the virtual telecommunication address with the corresponding contact telecommunication address for storage in an in call forwarding database 175. Upon the virtual telecommunication address being called by job seeker 110, telecommunications provider 170 will recognize the virtual telecommunication address and call forward the job seeker to job provider 130 at the corresponding contact telecommunication address stored in call forwarding database 175. In addition, telecommunications provider 170 may monitor the success and duration of the forwarded call and report that information back to job search intermediary 150. Job search intermediary 150 may accumulate this call forwarded success and duration information, analyze that information and develop job provider responsiveness metrics. These metrics may then be utilized to provide a job provider responsiveness rating to job seekers, or to affect the ranking of job postings displayed to job seekers.

While the telecommunication responsiveness system and method describes the use of telecommunications providers to generate virtual telecommunication addresses for call forwarding job seekers to job providers and monitoring the success and duration of those calls, these functions may be implemented by a job search intermediary in some circumstances. For example, where the job provider contact telecommunication address is a web address, such as in a video conferencing address, the job search intermediary may substitute a virtual telecommunication address that is a sub-address of the job search provider's web address. For another example, the virtual telecommunication address may be a phone number of the job search intermediary with an extension that is specific for call forwarding the call to the contact telecommunication address provided in the job posting. This may enable the job search intermediary to call forward a call from the job seeker to the job provider while monitoring the success and/or duration of that call. Of course, those of ordinary skill in the art may appreciate other variations of the telecommunication responsiveness system and method, some of which are mentioned below.

Figure 2:
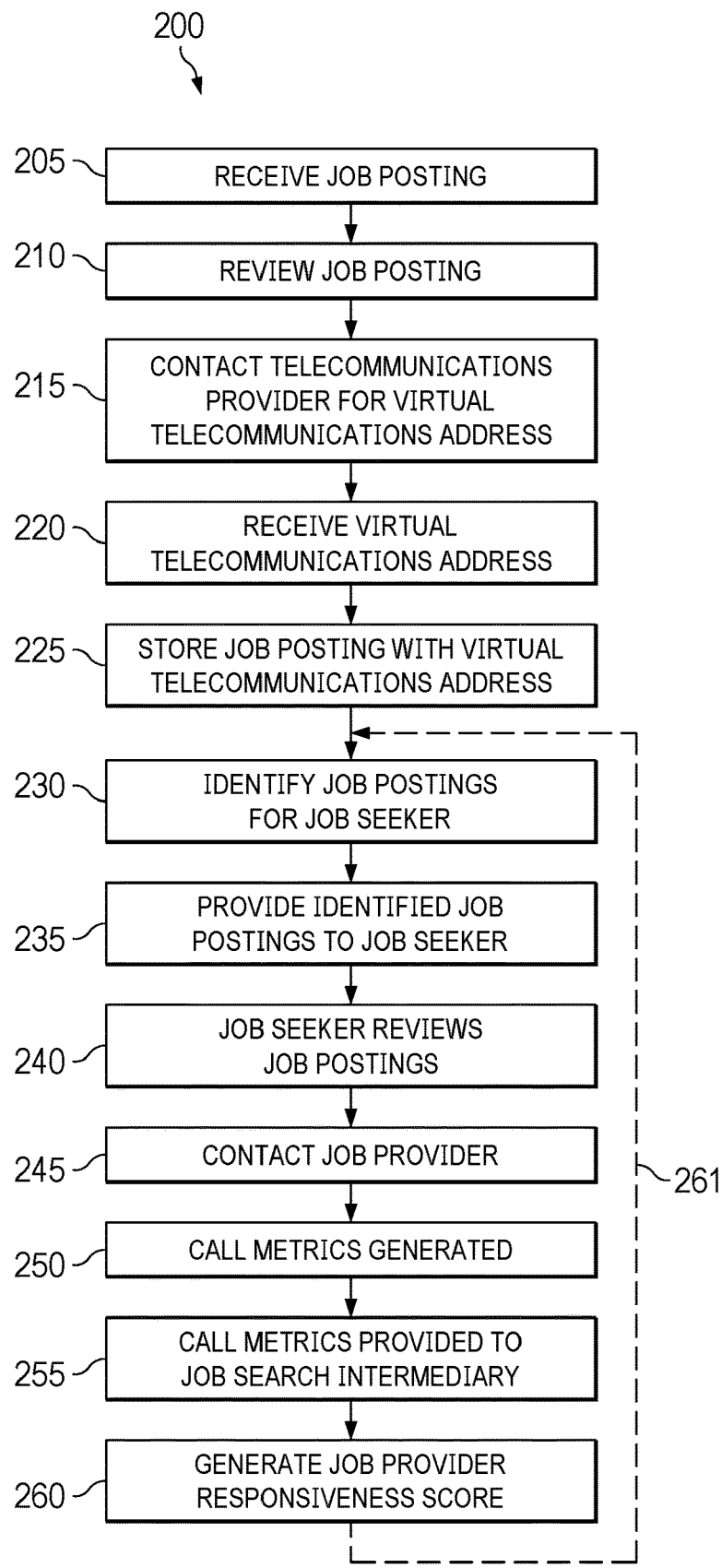
FIG. 2 depicts a high level flow diagram of a process for enabling telecommunications regarding posted jobs between job providers and job seekers.

FIG. 2 depicts a high level flow diagram of a process 200 for enabling telecommunications regarding posted jobs between job providers and job seekers including generating metrics of job provider responsiveness to subsequent job seeker calls to that job provider, in which various embodiments of the present disclosure may be implemented. FIG. 2 is described herein with reference to FIG. 1.

In a first operation 205, job search intermediary 150 may receive a description of an available job, referred to herein as a job posting, from a computer system or other telecommunications device of job provider 130. This job posting may include a general description of the available job, qualifications for the job including education, skills and prior work experience, location of the job, contact information for the job provider, and other relevant information. Then in operation 210, job search intermediary 150 may review the job posting for completeness, keywords, and other information. This may include identifying any telecommunication address (e.g., a telephone number or a video conferencing internet address) in the job posting for a job seeker 110 to contact job provider 130 by voice or other telephonic connection directly regarding the available job.

In operation 215, job search intermediary 150 may contact an appropriate telecommunications provider 170 for a substitute telecommunication address, also referred to herein as a virtual telecommunication address. The appropriate telecommunications provider may be based on the type of telecommunication address (e.g., telephone number, web address), the location of the job seeker and job provider, or other criteria. For example, some telecommunication providers handle mobile phone communications and others may handle video conferencing across the internet. For another example, telecommunication providers differ from country to country, so the country where the job seeker and job provider are located may affect the telecommunications provider contacted. Then in operation 220, telecommunications provider 170 generates and provides the virtual telecommunication address corresponding to the contact telecommunication address to job search intermediary 150 for use as described below. Telecommunications provider 170 also stores the association between the virtual telecommunication address and the contact telephony address in a call forwarding map 175. In operation 225, job search intermediary 150 adds the virtual telecommunication address for the contact telephony address in the job posting received from job provider 130 and stores the modified job posting in job posting database 155. Job search intermediary 150 may also store the association between the virtual telecommunication address and the contact telephony address in a local call forwarding map. In an alternative embodiment, the original job posting may be stored in job posting database 155 and the call forwarding map may be utilized for substituting the virtual telecommunication address for the contact telephony contact before providing the job posting to a job seeker.

In operation 230, job search intermediary 150 may identify a set of job postings from job postings database 155 to provide to job seeker 110. These job postings may be identified based on a query from the job seeker, from a comparison of job postings to a resume and other personal profile information of the job seeker, or based on other events and criteria, alone or in combination. For example, job seeker 110 may request a daily email listing of job postings for review and consideration based on a combination of provided criteria and the job seeker's personal profile. This set of identified job postings may be modified by job search intermediary 150 based on a job provider's prior responsiveness rating, such as described below, and/or a ranking and ordering of the identified job postings may be affected by the job provider's prior responsiveness rating. Then in operation 235, upon identifying the set of job postings from job posting database 155, job search intermediary 150 may provide the identified set of job postings to job seeker 110. The identified set of job postings may be provided in a ranked order based on a variety of criteria including the job provider's responsiveness rating. Each of the job postings may also include a responsiveness rating of the corresponding job provider, such as a one to five star rating. The job postings may include a virtual telecommunication address for contacting the job provider directly by voice or other telephonic connection. An example of job postings provided to or otherwise displayed for the job seeker are described below with reference to FIGS. 3A-3B.

Responsive to receiving the set of job postings, job seeker 110 may review selected job postings in operation 240. Upon finding a job posting of interest, job seeker 110 may wish to contact job provider 130 for additional information regarding the job posting. Then in operation 245, job seeker 110 may contact job provider 130 using the virtual telecommunication address provided in the job posting. Upon the job seeker calling the virtual telecommunication address across telecommunications networks 105, telecommunications provider 170 may find a corresponding contact telecommunication address in call forwarding map 175 and forward the call to job provider 130. For example, if job seeker 110 is using a mobile phone to place the call, then the call may be made across a cellular network to a cellular network provider that manages calls for that mobile phone. In operation 250, telecommunications provider 170 may then monitor the success and duration or other metrics of the forwarded call to the job provider. The success of the call may be one of several types of success or lack thereof. The call may not be answered (and the number of rings or other measure of time before the call is disconnected), the line called may be busy, the call may be answered by the job provider by an automated system for the job seeker to leave a message, or the call may be answered by a live person. In addition, a duration of the call may be measured. The duration may be measured from the moment the call is call forwarded, to when the call is answered, or other measure. The success types may differ by country, telecommunications provider, by type of network, by type of device, etc. Other types of information regarding the call me be legitimately tracked depending on a variety of factors. For example, the job seeker may provide a review of the call experience after the call with the job provider was completed. For another example, if the job seeker submits a resume to the job provider after the call was completed, that would also be a positive influence on the quantified call responsiveness of the job provider. The success, duration and other factors of the call are collectively referred to herein as call metrics, telecommunications metrics, or telephony metrics. Upon completion of the forwarded call, in operation 255, the success and duration and other metrics of the call may be immediately forwarded to the job search provider, or the metrics may be stored and/or accumulated locally by telecommunications provider for forwarding to job search provider periodically, on demand, or via a predetermined schedule.

Upon receiving the success and duration of one or more calls from job seekers to job providers, in operation 260, job search intermediary may analyze the call metrics and quantify a call responsiveness of the job providers. Where the job provider may provide multiple telecommunication addresses, in the same or different job postings, a separate quantified call responsiveness rating, which may be a responsiveness score, may be determined for each telecommunication address. Alternatively, a quantified call responsiveness may be determined for each job provider across all telecommunication addresses provider by those job provider.

One example of a quantified job provider responsiveness is a job provider responsiveness score. Such a responsiveness score may be calculated through a fairly simple formula such as a percentage of calls that are successfully completed multiplied times a percentage of successful calls that exceed a 90 second minimum (i.e., indicating a substantive communication). For example, if only half of calls made to the virtual telecommunication address are successful, but 80 percent of those are longer than 90 seconds, then the responsiveness score would be 50 percent multiplied times 80 percent equaling a responsiveness score of 40 percent or 2 out of 5 stars. As a job provide improves the call success rate and/or the call duration minimum, then a combination of calls with a success score and an average duration. This responsiveness score may be an overall average or a running average. That is, a running average will reduce or eliminate older call metrics, thereby allowing a job provider to substantially improve its responsiveness score with continue good responsiveness. If only 6 calls had been made, then the number 6 may be displayed next to the responsiveness score such as shown below with reference to FIGS. 3A-3B. Of course, those of ordinary skill in the art would appreciate other ways to generate a responsiveness score using the call metrics that were determined and stored as described herein. Additional details on the determining quantified call responsiveness of the job provider may be described below with reference to the Figures. This quantified call responsiveness or responsiveness score, may then be utilized in providing job postings to future job seekers, as shown with reference to dotted line 261 to operations 230-235 described above, and with reference below to FIGS. 3A-3B.

Figure 3A:
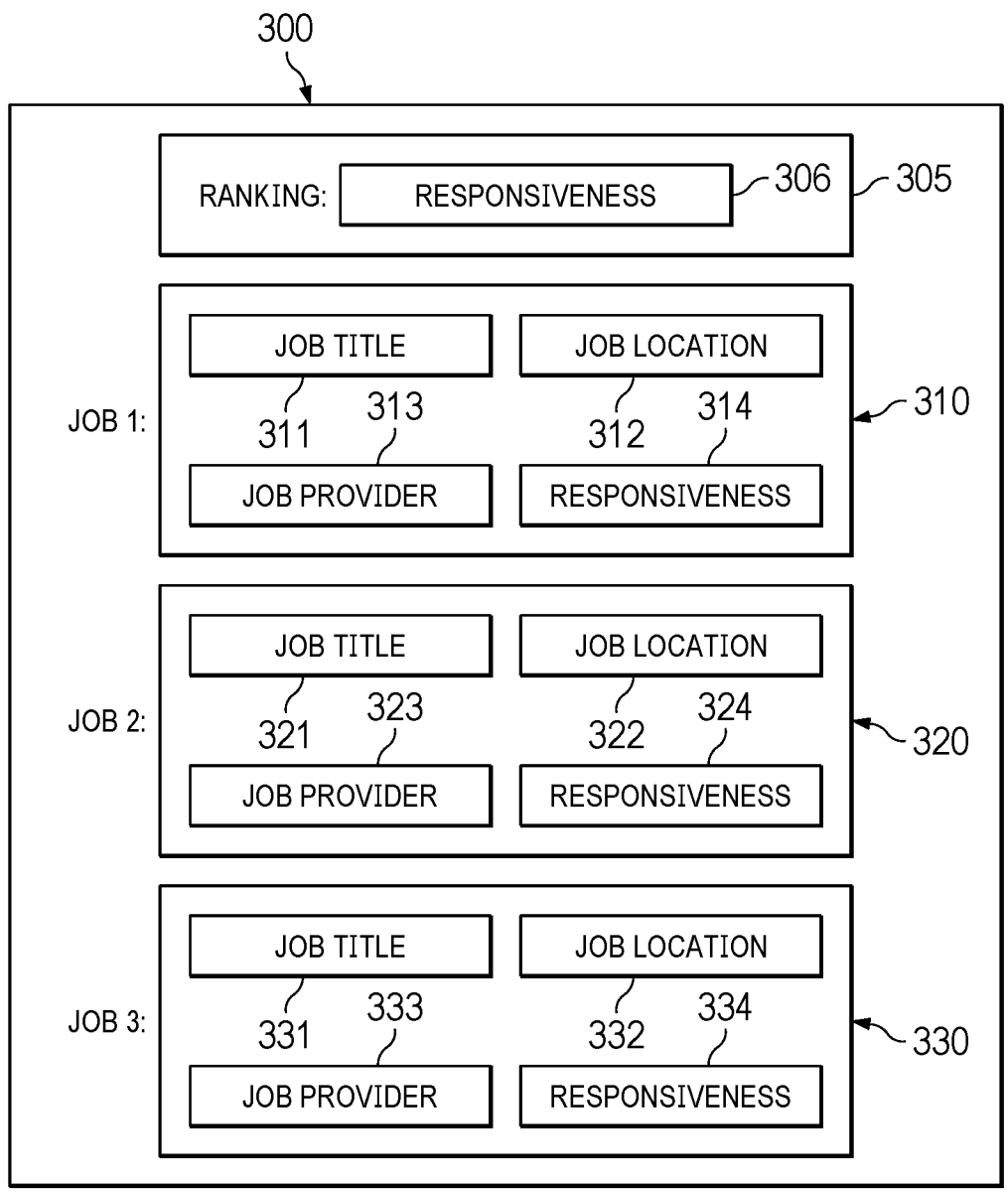
FIGS. 3A-3B depict examples of presenting quantified job provider responsiveness to a job seeker.
Figure 3B:
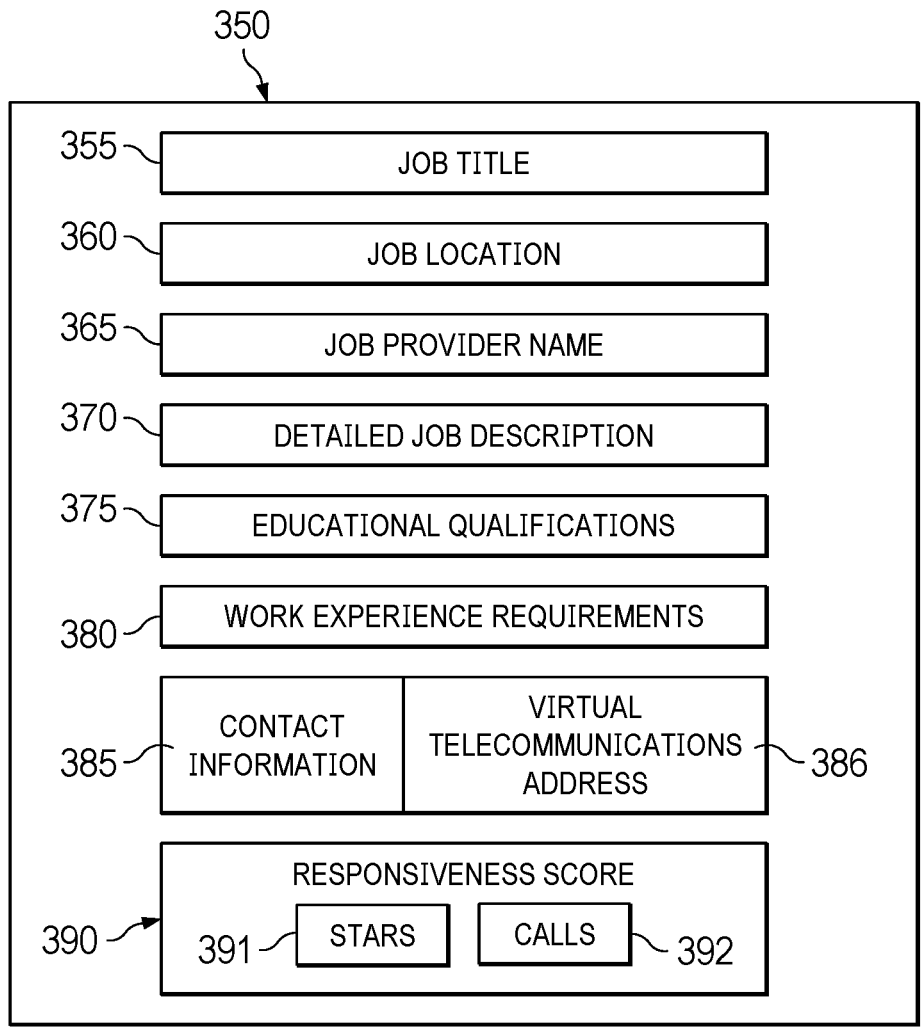

FIGS. 3A-3B depict examples of presenting job postings, including quantified job provider responsiveness to a job seeker, in which various embodiments of the present disclosure may be implemented. These job postings may be displayed to a job seeker in response to a job search query, periodically in an email as part of a subscription, or in response to other types of inquiries or registrations of job seekers.

FIG. 3A depicts an example of multiple job postings, which may be displayed on a job seeker's computer system or other telecommunications device, in response to a job search query or other inquiry. Display 300 may include three or more job postings 310, 320 and 330 that are ranked according to a user selected ranking 306. Additional jobs may be viewed by the job seeker by scrolling the displayed jobs. Display 300 may include a ranking pull down menu 305 which includes various types of rankings the job seeker may select. In the telecommunication responsiveness system and method, the job seeker has selected job provider responsiveness 306. Alternatively, the job seeker could select other rankings such as distance of the job location from the job seeker's home, fit with the job seeker's resume, or other factors. Each displayed job 310, 320 and 330 may include a job title 311, 321 and 331, a job location 312, 322 and 332, a job provider name 313, 323 and 333, as well as a job provider responsiveness 314, 324 and 334. The job provider responsiveness may be displayed as a quantified score in terms of one to five stars or other indication of responsiveness. If the job seeker wants any additional information regarding a different job, the job seeker may select a job such as by mouse clicking one of the displayed jobs. Upon selecting a job, the selected job may be displayed as shown in FIG. 3B below.

FIG. 3B depicts an example of a displayed job description 350 such as if the job seeker clicked on one of the job postings shown in FIG. 3A. This displayed job posting may include a job provider responsiveness score in terms of one to five stars. In this example, displayed job description includes a job title 355, job location 360, job provider name 365, detailed job description 370, educational qualifications 375, work experience qualifications 380, job provider contact information 385 including a virtual telecommunication address 386, and a job provider responsiveness score 390. As described above, any contact telecommunication address (e.g., a phone number) may have been replaced with virtual telecommunication address 386. Job provider responsiveness score 390 may include a number of stars 391 and a number of calls 392 from which to base this responsiveness score. The number of calls may be removed from the displayed responsiveness score once a certain number of calls have been placed to this job provider. Those of ordinary skill in the art would appreciate alternative ways to display the same or similar data as shown in FIGS. 3A and 3B.

The above described FIGS. 3A and 3B are just examples of job postings that may be displayed or otherwise provided to a job seeker in response to a query or other inquiry, either with a job provider responsiveness score or whereby such a responsiveness score may affect the ordering of such displayed job postings. As would be appreciated by one of ordinary skill in the art, information regarding job postings may be displayed in a variety of formats and interfaces.

Figure 4:
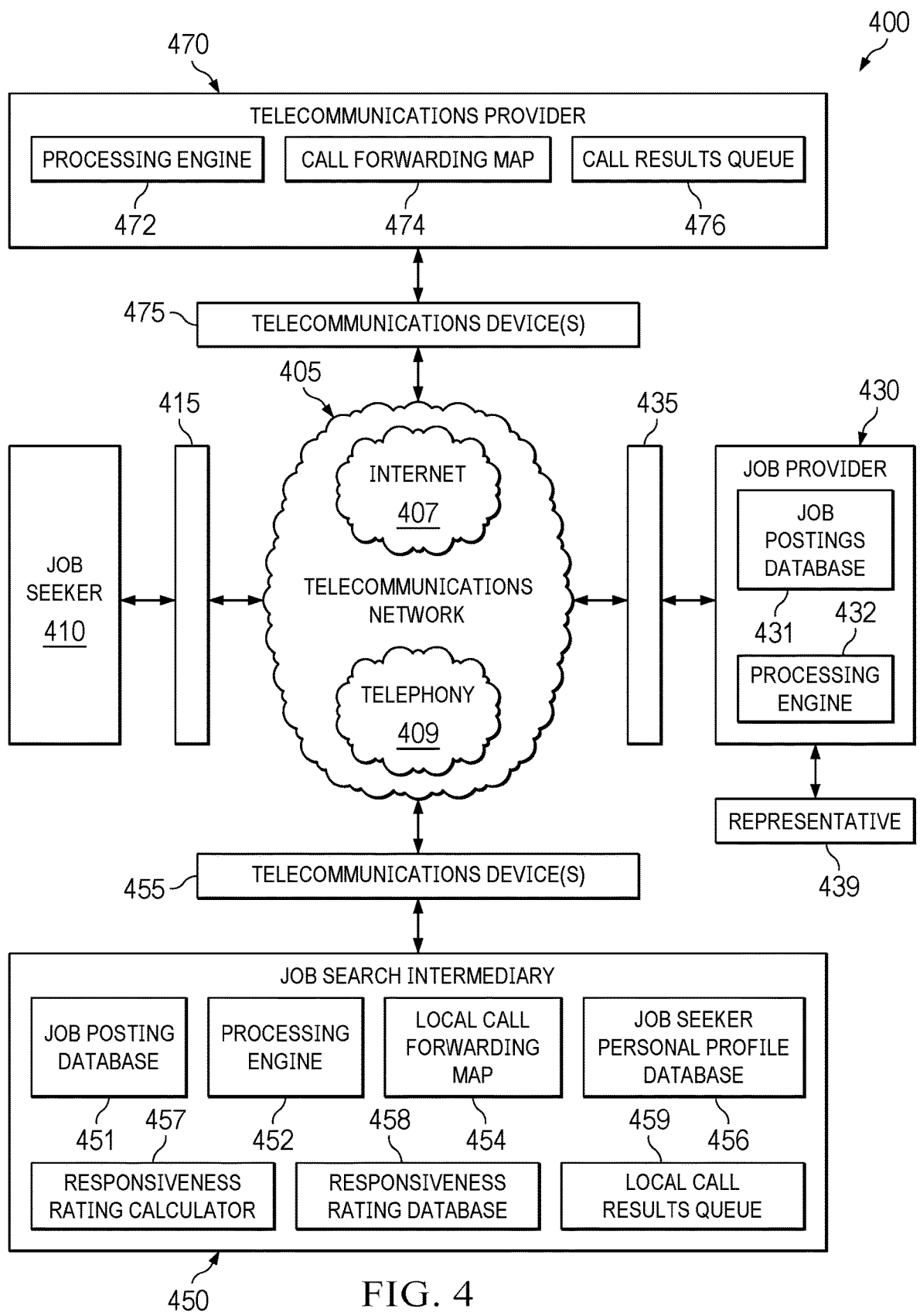
FIG. 4 depicts a more detailed block diagram of a telecommunication system for enabling telecommunications regarding posted jobs between job providers and job seekers.

FIG. 4 depicts a more detailed block diagram of a telecommunication system 400 for enabling telecommunications regarding posted jobs between job providers and job seekers including generating metrics of job provider responsiveness to subsequent job seeker calls to that job provider, in which various embodiments of the present disclosure may be implemented. Additional details regarding this system is provided below with reference to other Figures.

Telecommunications system 400 includes a job seeker 410, a job provider 430 and a job search service provider 450 communicating with each other across telecommunications networks 405. Those communications may be enabled by telecommunications provider(s) 470. Although job seeker 410, job provider 430, job search intermediary 450 and telecommunications provider 470 are shown in the singular, each may include many other such seekers and providers. Telecommunications networks 405 may include internet 407, telephony network 409, and other networks which may be available for persons and entities to communicate with each other. Traditionally, telephony network 409 is analog based and internet 407 is digital based, although bridges between these networks have been established enabling telecommunications to occur through a variety of pathways and devices.

Job seeker 410 may include or utilize telecommunications device 415 to communicate with others across telecommunications network 405. Job provider 430 may include a local job postings database 431, processing engine 432 and representative 439. Database 431 may include job postings generated through the use of processing engine 432 of available jobs which may be provided through telecommunications device 435 to job search intermediary 450. These job postings may include a telecommunication address of job provider representative 439. Telecommunications provider 470 may include a processing engine 472, a call forwarding map 474 and a call results queue 476. Upon a request received from job search intermediary 450 through telecommunications network 405 and telecommunications device 475, telecommunications provider 470 may utilize processing engine 472 to generate a virtual telecommunication address as a substitute for a contact telecommunication address, store the association between the addresses in call forwarding map 474, and forward the virtual telecommunication address back to job search intermediary 450. Subsequently, when telecommunications provider receives a call to the virtual telecommunication address, call forwarding map 474 is utilized to forward that call to the contact telecommunication address. In addition, certain metrics regarding the forwarded call, such as status and duration, are detected, stored in call results queue 476 and forwarded to job search intermediary 450.

Job search intermediary 450 may include a job posting database 451, processing engine 452, local call forwarding map 454, job seeker personal profile database 456, responsiveness rating calculator 457, responsiveness rating database 458 and local call results queue 459. Upon receiving a job posting from job provider 430 across telecommunications network 405, processing engine 452 may review the job posting and identify any contact telecommunication addresses in the job posting. Upon finding a contact telecommunication address, processing engine 452 may identify and contact telecommunications provider 470 to obtain a virtual telecommunication address as a substitute. The association between the telecommunication addresses may be stored by processing engine 452 in local call forwarding map 454. In addition, processing engine 452 may substitute the virtual telecommunication address for the contact telecommunication address in the job posting, which may now be stored in job posting database 451. Subsequently, job search intermediary 450 may receive a set of call results from telecommunications provider 470, which may be stored in local call results queue 459. Responsiveness rating calculator 457 (which may be software implemented on processing engine 452) may then analyze the call results and generate a quantified job provider responsiveness rating for storage in responsiveness rating database 458. Then, upon receiving a job search query from job seeker 410, processing engine 452 may provide a set of job posting results based on the job seeker personal profile stored in database 456, job provider responsiveness score from database 458, and other factors. The job search results may also include a visual or other indications of the job provider responsiveness score for each job posting provided to the job seeker.

In summary, job seeker 410 may be one or more job seekers utilizing computer systems or other telecommunications devices 415 to seek employment with one or more job providers 430 across internet 407 through telecommunications devices 455. In doing so, job seeker 410 may utilize the services of job search intermediary 450 to search and view job postings from multiple such job providers. Job search intermediary 450 may maintain a set of job postings from job providers 430 in a job posting database 451. Each such job posting may include contact information of the job provider, either in the job posting or in response to a query from job seeker 410. This job provider contact information may include a telephone number or other telecommunication address for job seeker 410 to call a representative 439 of job provider 430 for a live electronic voice communication. Such a telecommunication may utilize the services of one or more telecommunication providers 470. For example, job seeker 410 may utilize a mobile phone or other telecommunications device 415 that utilizes the cellular network of a first telecommunications provider and job provider 430 may utilize a landline or other telecommunications device 455 that utilizes the landline network of a second telecommunications provider 430.

As explaining in greater detail below, prior to providing a job posting from job provider 430 to job seeker 410, job search intermediary 450 (also referred to herein as a job search service provider) may identify and replace a contact telecommunication address from the job provider contact information with a virtual telecommunication address (e.g., a virtual phone number). This virtual telecommunication address may be obtained by job search intermediary 450 from telecommunications provider 470, which also associates the virtual telecommunication address with the corresponding contact telecommunication address for storage in call forwarding database 475. Upon the virtual telecommunication address being called by job seeker 410, telecommunications provider 470 may recognize the virtual telecommunication address and call forward the job seeker to job provider 430 at the corresponding contact telecommunication address stored in call forwarding database 475. In addition, telecommunications provider 470 may monitor the success and duration of the forwarded call and report that information back to job search intermediary 450. Job search intermediary 450 may accumulate this call forwarded success and duration information, analyze that information and develop job provider responsiveness metrics. These metrics may then be utilized to provide a job provider responsiveness rating to job seekers, or to affect the ranking of job postings displayed to job seekers.

While the telecommunication responsiveness system and method describes the use of telecommunications providers to generate virtual telecommunication addresses for call forwarding job seekers to job providers and monitoring the success and duration of those calls, these functions may be implemented by a job search intermediary in some circumstances. For example, where the job provider contact telecommunication address is a web address, such as in a video conferencing address, the job search intermediary may substitute a virtual telecommunication address that is a sub-address of the job search provider's web address. For another example, the virtual telecommunication address may be a phone number of the job search intermediary with an extension that is specific for call forwarding the call to the contact telecommunication address provided in the job posting. This may enable the job search intermediary to call forward a call from the job seeker to the job provider while monitoring the success and/or duration of that call. Of course, those of ordinary skill in the art may appreciate other variations of the telecommunication responsiveness system and method, some of which are mentioned below.

Figure 5A:
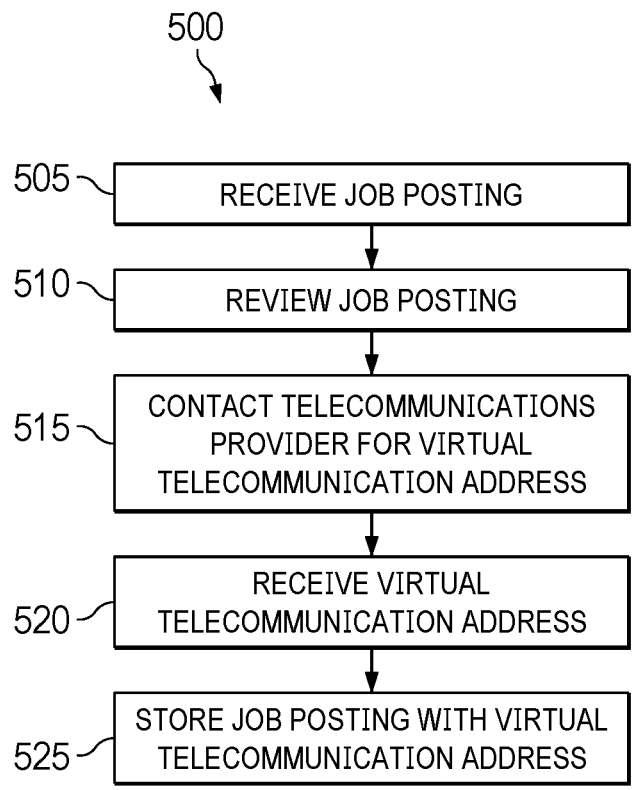
FIGS. 5A-5C depict more detailed flow diagrams of processes for enabling telecommunications regarding posted jobs between job providers and job seekers.
Figure 5B:
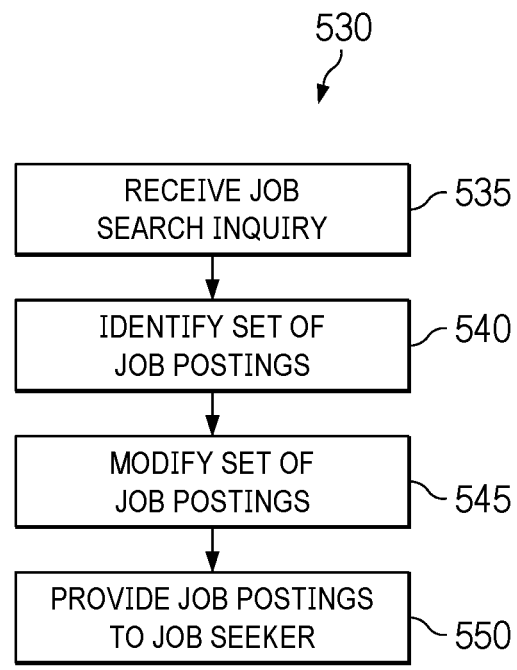
Figure 5C:
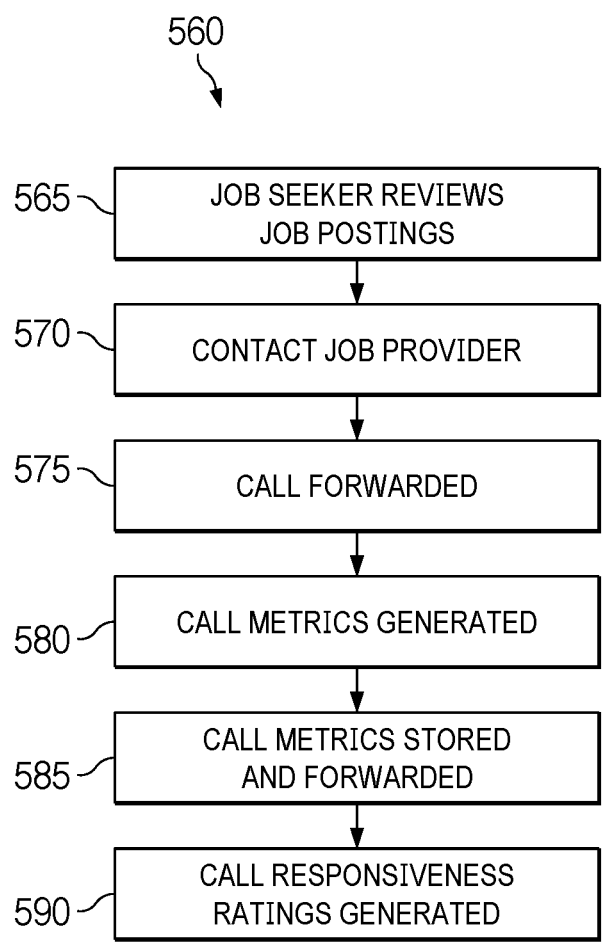

FIGS. 5A-5C depict more detailed flow diagrams of processes for enabling telecommunications regarding posted jobs between job providers and job seekers including generating metrics of job provider responsiveness to subsequent job seeker calls to that job provider, in which various embodiments of the present disclosure may be implemented. FIGS. 5A-5C are described herein with reference to FIG. 4.

FIG. 5A depicts a flow diagram 500 of processes for job search intermediary 450 adding a job posting from a job provider 430 to job posting database 455, in which various embodiments of the present disclosure may be implemented. FIG. 5A may correspond to operations 205-225 described with reference to FIG. 2 above. In a first operation 505, computer system or other telecommunications device 455 of job search intermediary 450 may receive a packet of data or other type of data file describing an available job, referred to herein as a job posting, from a computer system or other telecommunications device 435 of job provider 430. This job posting may include a general description of the available job, qualifications for the job including education, skills and prior work experience, location of the job, contact information for the job provider, and other relevant information, such as described above with reference to FIGS. 3A-3B. This job posting may have been previously generated by job provider 450 and stored in local job postings database 431, prior to sending the job posting to job search intermediary 450. Then in operation 510, processing engine 452 of job search intermediary 450 may automatically review the job posting for completeness, keywords, and other information. This may include identifying any telecommunication address (e.g., a telephone number or a video conferencing internet address) in the job posting for a job seeker 410 to contact job provider 430 by voice or other telephonic connection directly regarding the available job.

In operation 515, job search intermediary 150 may utilize telecommunications device 455 to automatically contact through internet 407 a telecommunications device 475 of an appropriate telecommunications provider 470 for a substitute telecommunication address, also referred to herein as a virtual telecommunication address. The appropriate telecommunications provider may be based on the type of telecommunication address (e.g., telephone number, web address), the location of the job seeker and job provider, or other criteria. For example, some telecommunication providers handle mobile phone communications and others may handle video conferencing across the internet. For another example, telecommunication providers differ from country to country, so the country where the job seeker and job provider are located may affect the telecommunications provider contacted.

Then in operation 520, telecommunications device 455 of job search intermediary 450 received the virtual telecommunication address corresponding to the contact telecommunication address that may have been generated by processing engine 472 of telecommunications provider 470. Processing engine 472 of telecommunications provider 470 may also store the association between the virtual telecommunication address and the contact telephony address in a call forwarding map 474 for use as described below. In operation 525, processing engine 452 of job search intermediary 450 may add the virtual telecommunication address for the contact telephony address in the job posting received from job provider 430 and stores the modified job posting in job posting database 455. Processing engine 452 of job search intermediary 450 may also store the association between the virtual telecommunication address and the contact telephony address in a local call forwarding map 454. In an alternative embodiment, the original job posting with the original contact telecommunication address may be stored by processing engine 452 in job posting database 451 and local call forwarding map 454 may be utilized for substituting the virtual telecommunication address for the contact telephony contact before providing the job posting to a job seeker 410.

FIG. 5B depicts a flow diagram 530 of processes for job search intermediary 450 adding a job posting from a job provider 430 to job posting database 455, in which various embodiments of the present disclosure may be implemented. FIG. 5B may correspond to operations 230-235 described with reference to FIG. 2 above. In a first operation 535, telecommunications device 455 of job search intermediary 450 may receive a job search query or other inquiry from telecommunications system 415 of job seeker 410. This query may be a set of search parameters, perhaps from an ongoing online session, received from job seeker 410. For example, the job seeker may have registered and provided a result or other personal profile with the job search intermediary 450 (which may have been stored in job seeker personal profile database 456) and is conducting an online job search. For another example, job seeker 410 may request a daily email listing of job postings for review and consideration based on a combination of provided criteria and the job seeker's personal profile.

In operation 540, processing engine 452 of job search intermediary 450 may identify a set of job postings from job postings database 451 to provide to job seeker 410. These job postings may be identified based on the query from the job seeker, from a comparison of job postings to a resume and other personal profile information of the job seeker, or based on other events and criteria, alone or in combination. Then in operation 545, this set of identified job postings may be modified by job search intermediary 450 based on a job provider's prior responsiveness rating previously stored in responsiveness rating database 458. This set of identified job postings may also be ranked, sorted or filtered based in a job provider's prior responsiveness rating. Further details regarding generating and storing such job provider responsiveness ratings is described in greater detail below with reference to FIG. 5C.

Then in operation 550, upon identifying and sorting the set of job postings from job posting database 455, job search intermediary 450 may provide the identified set of job postings to telecommunications device 415 of job seeker 410. As described above, the identified set of job postings may be provided in a ranked, sorted or filtered order based on a variety of criteria including the job provider's responsiveness rating. Each of the job postings may also include a responsiveness rating of the corresponding job provider, such as a one to five star rating. The job postings may include a virtual telecommunication address for contacting the job provider directly by voice or other telephonic connection. An example of job postings provided to or otherwise displayed for the job seeker are described above with reference to FIGS. 3A-3B.

FIG. 5C depicts a flow diagram 560 of processes towards job search intermediary 450 determining a quantified job provider responsiveness of a job provider 430, in which various embodiments of the present disclosure may be implemented. FIG. 5C may correspond to operations 240-260 described with reference to FIG. 2 above. In a first operation 565, responsive to receiving the set of job postings, job seeker 410 may review selected job postings in operation 550. Upon finding a job posting of interest, job seeker 410 may wish to contact job provider 430 for additional information regarding the job posting. Then in operation 570, job seeker 410 may contact a representative 439 of job provider 430 with telecommunications device 415 using the virtual telecommunication address provided in the job posting.

In operation 575, upon the job seeker calling the virtual telecommunication address across telecommunications networks 405, processing engines 472 of telecommunications provider 470 may find a corresponding contact telecommunication address in call forwarding map 475 and forward the call to job provider 430 across telecommunications network 405. For example, if job seeker 410 is using a mobile phone to place the call, then the call may be made across a cellular network to a cellular network provider that manages calls for that mobile phone.

In operation 580, processing unit 472 of telecommunications provider 470 may then monitor the success and duration or other metrics of the forwarded call to the job provider. The success of the call may be one of several types of success or lack thereof. The call may not be answered (and the number of rings or other measure of time before the call is disconnected), the line called may be busy, the call may be answered by the job provider by an automated system for the job seeker to leave a message, or the call may be answered by a live person. In addition, a duration of the call may be measured. The duration may be measured from the moment the call is call forwarded, to when the call is answered, or other measure. The success types may differ by country, telecommunications provider, by type of network, by type of device, etc. Other types of information regarding the call me be legitimately tracked depending on a variety of factors. For example, the job seeker may provide a review of the call experience after the call with the job provider was completed. For another example, if the job seeker submits a resume or other personal profile information to the job provider after the call was completed, that would also be a positive influence on the quantified call responsiveness of the job provider. The success, duration and other factors of the call are collectively referred to herein as call metrics, telecommunications metrics, or telephony metrics. Upon completion of the forwarded call, in operation 585, the success and duration and other metrics of the call may be immediately forwarded to job search provider 450 or that information may be stored and/or accumulated locally in call results queue 476 by telecommunications provider for periodic forwarding to job search provider 450.

While the telecommunication responsiveness system and method describes the use of telecommunications providers to generate virtual telecommunication addresses for call forwarding job seekers to job providers and monitoring the success and duration of those calls, operations 580-585 may be implemented by job search intermediary 450 in some circumstances. For example, where the job provider contact telecommunication address is a web address, such as in a video conferencing address, the job search intermediary may substitute a virtual telecommunication address that is a sub-address of the job search provider's web address. For another example, the virtual telecommunication address may be a phone number of the job search intermediary with an extension that is specific for call forwarding the call to the contact telecommunication address provided in the job posting. This may enable the job search intermediary to call forward a call from the job seeker to the job provider while monitoring the success and/or duration of that call. Of course, those of ordinary skill in the art may appreciate other variations of the telecommunication responsiveness system and method, some of which are mentioned below.

Upon receiving the success and duration of one or more calls from job seekers to job providers, in operation 590, responsiveness rating calculator 457 of job search intermediary 450 may analyze the call metrics and quantify a call responsiveness of the job providers for storage in responsiveness rating database 458. Where the job providers may provide multiple telecommunication addresses, in the same or different job postings, a separate quantified call responsiveness rating, which may be a responsiveness score, may be determined for each telecommunication address. Alternatively, a quantified call responsiveness rating may be determined for each job provider across all telecommunication addresses provider by those job providers.

An example of a quantified job provider responsiveness rating is a job provider responsiveness score. Such a responsiveness score may be calculated through a fairly simple formula such as a percentage of calls that are successfully completed multiplied times a percentage of successful calls that exceed a 90 second minimum (i.e., indicating a substantive communication). More complex job provider responsiveness ratings may be utilized such as a combinatorial score based on the type of call success and duration of each call with weighted gradations for different call durations. This quantified call responsiveness rating or responsiveness score, may then be utilized in providing job postings to future job seekers such as described above with reference to FIG. 5B.

Figure 6:
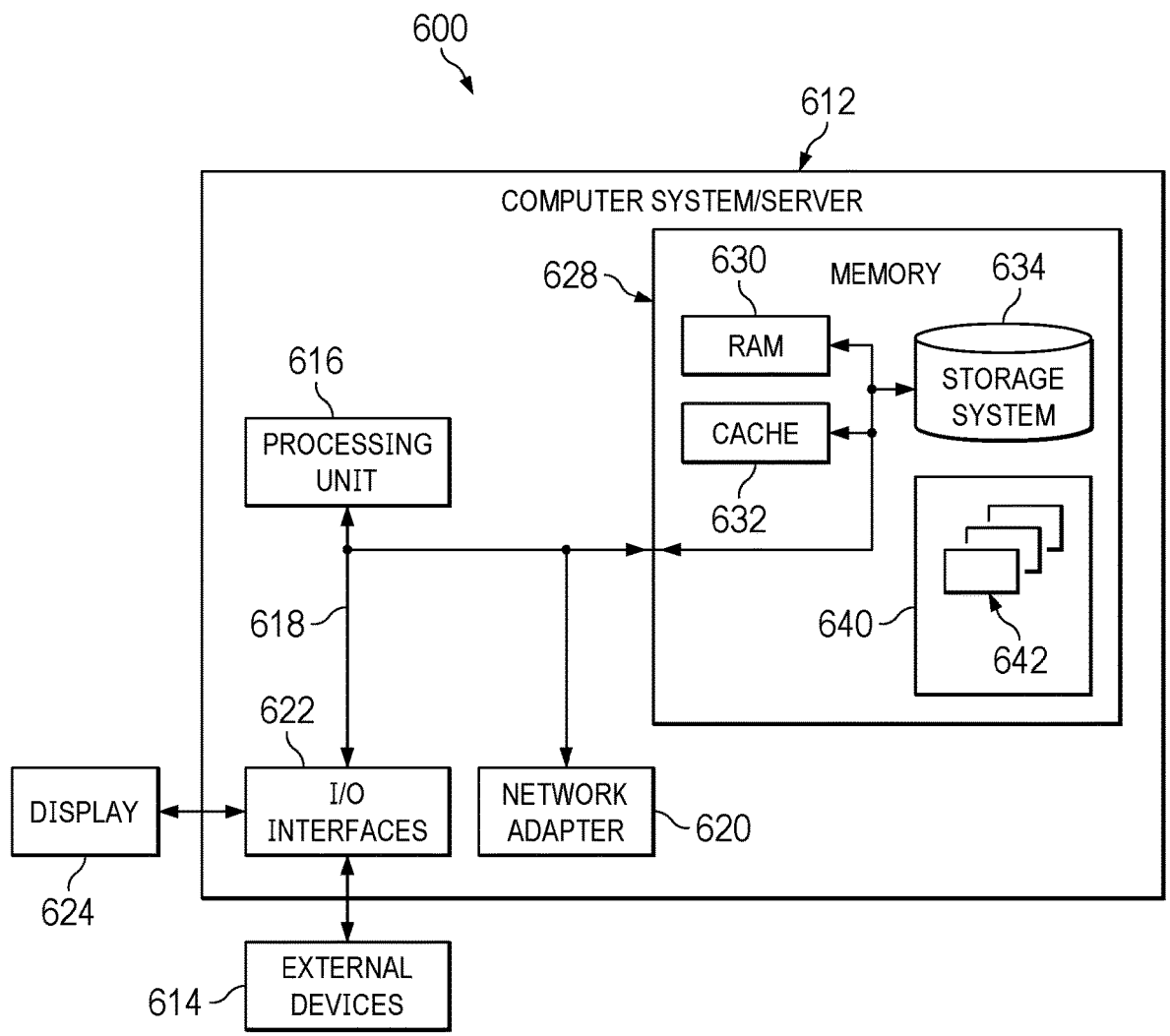
FIG. 6 depicts a block diagram of an illustrative data processing system in which various embodiments of the present disclosure may be implemented.

FIG. 6 depicts a block diagram of an illustrative data processing system in which various embodiments of the present disclosure may be implemented. Data processing system 600 is one example of a suitable data processing system and is not intended to suggest any limitation as to the scope of use or functionality of the embodiments described herein. Regardless, data processing system 600 is capable of being implemented and/or performing any of the functionality set forth herein such as enabling telecommunications regarding posted jobs between job providers and job seekers including generating metrics of job provider responsiveness to subsequent job seeker calls to the job provider.

In data processing system 600 there is a computer system/server 612, which is operational with numerous other computing system environments, peripherals, or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-performable instructions, such as program modules, being processed by a computer system. Generally, program modules may include routines, programs, objects, components, logic, data structures, and so on that perform particular tasks or implement particular abstract data types. Computer system/server 612 may be practiced in distributed computing environments where tasks are performed by remote processing devices that are linked through a communications network. In a distributed computing environment, program modules may be located in both local and remote computer system storage media including memory storage devices. For example, embodiments of systems and methods described may be implemented in a cloud computing environment, distributed or otherwise, which may be virtualized such as with the use of a hypervisor managing multiple nodes including virtual processors, virtual memory, etc.

As shown in FIG. 6, computer system/server 612 in data processing system 600 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of non-transitory computer system usable media. Such media may be any available media that is accessible by computer system/server 612, and it includes both volatile and non-volatile media, removable and non-removable media.

System memory 628 may include non-transitory computer system readable media in the form of volatile memory, such as random access memory (RAM) 630 and/or cache memory 632. Computer system/server 612 may further include other non-transitory removable/non-removable, volatile/non-volatile computer system storage media. By way of example, storage system 634 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 618 by one or more data media interfaces. Memory 628 may include at least one program product having a set (e.g., at least one) of program modules that are configured to carry out the functions of the embodiments. Memory 628 may also include data that will be processed by a program product.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of the embodiments. For example, a program module may be software for enabling telecommunications regarding posted jobs between job providers and job seekers including generating metrics of job provider responsiveness to subsequent job seeker calls to the job provider.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via I/O interfaces 622 through wired connections or wireless connections. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to microcode, device drivers, tape drives, RAID systems, redundant processing units, data archival storage systems, external disk drive arrays, etc.

Figure 7:
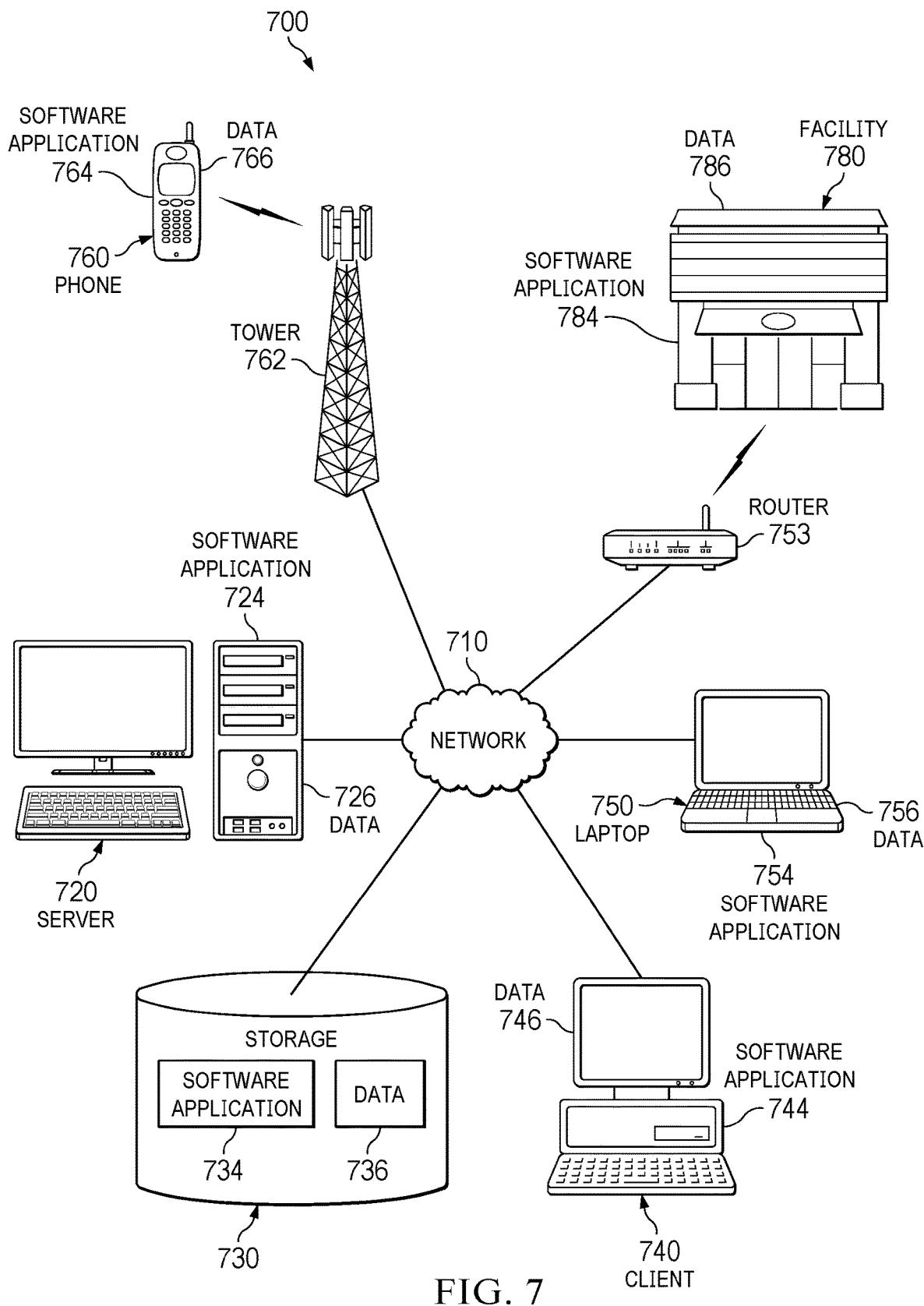
FIG. 7 depicts a block diagram of an illustrative network of data processing systems in which various embodiments of the present disclosure may be implemented.

FIG. 7 depicts a block diagram of an illustrative network of data processing systems in which various embodiments of the present disclosure may be implemented. Data processing environment 700 is a network of data processing systems such as described above with reference to FIG. 6. Software applications such as for enabling telecommunications regarding posted jobs between job providers and job seekers including generating metrics of job provider responsiveness to subsequent job seeker calls to the job provider may be processed on any computer or other type of data processing system in data processing environment 700. Data processing environment 700 includes network 710. Network 710 is the medium used to provide simplex, half duplex and/or full duplex communications links between various devices and computers connected together within data processing environment 700. Network 710 may include connections such as wire, wireless communication links, or fiber optic cables.

Server 720 and client 740 are coupled to network 710 along with storage unit 730. In addition, laptop 750 and facility 780 (such as a home or business) are coupled to network 710 including wirelessly such as through a network router 753. A mobile device 760 such as a mobile phone may be coupled to network 710 through a cell tower 762. Data processing systems, such as server 720, client 740, laptop 750, mobile device 760 and facility 780 contain data and have software applications including software tools processing thereon. Other types of data processing systems such as personal digital assistants (PDAs), smartphones, tablets and netbooks may be coupled to network 710.

Server 720 may include software application 724 and data 726 for enabling telecommunications regarding posted jobs between job providers and job seekers including generating metrics of job provider responsiveness to subsequent job seeker calls to the job provider or other software applications and data in accordance with embodiments described herein. Storage 730 may contain software application 734 and a content source such as data 736 for enabling telecommunications regarding posted jobs between job providers and job seekers including generating metrics of job provider responsiveness to subsequent job seeker calls to the job provider. Other software and content may be stored on storage 730 for sharing among various computer or other data processing devices. Client 740 may include software application 744 and data 746. Laptop 750 and mobile device 760 may also include software applications 754 and 764 and data 756 and 766. Facility 780 may include software applications 784 and data 786 on local data processing equipment. Other types of data processing systems coupled to network 710 may also include software applications. Software applications could include a web browser, email, or other software application for enabling telecommunications regarding posted jobs between job providers and job seekers including generating metrics of job provider responsiveness to subsequent job seeker calls to the job provider.

Server 720, storage unit 730, client 740, laptop 750, mobile device 760, and facility 780 and other data processing devices may couple to network 710 using wired connections, wireless communication protocols, or other suitable data connectivity. Client 740 may be, for example, a personal computer or a network computer.

In the depicted example, server 720 may provide data, such as boot files, operating system images, and applications to client 740 and laptop 750. Server 720 may be a single computer system or a set of multiple computer systems working together to provide services in a client server environment. Client 740 and laptop 750 may be clients to server 720 in this example. Client 740, laptop 750, mobile device 760 and facility 780 or some combination thereof, may include their own data, boot files, operating system images, and applications. Data processing environment 700 may include additional servers, clients, and other devices that are not shown.

In the depicted example, data processing environment 700 may be the Internet. Network 710 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 700 also may be implemented as a number of different types of networks, such as for example, an intranet, a local area network (LAN), or a wide area network (WAN). FIG. 7 is intended as an example, and not as an architectural limitation for the different illustrative embodiments.

Among other uses, data processing environment 700 may be used for implementing a client server environment in which the embodiments may be implemented. A client server environment enables software applications and data to be distributed across a network such that an application functions by using the interactivity between a client data processing system and a server data processing system. Data processing environment 700 may also employ a service oriented architecture where interoperable software components distributed across a network may be packaged together as coherent business applications.

Embodiments of the system and method for enabling telecommunications regarding posted jobs between job providers and job seekers including generating metrics of job provider responsiveness to subsequent job seeker calls to the job provider may be implemented in any manner including as a computer program product at any possible technical detail level of integration. The computer program product may include a computer readable storage medium (or media) having computer readable program instructions thereon for causing a processor to carry out aspects of embodiments of the system and method for enabling telecommunications including generating metrics of job provider responsiveness to subsequent job seeker calls to the job provider.

The computer readable storage medium can be a tangible device that can retain and store instructions for use by an instruction processing device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present system and method may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or other programming languages such as Java. The computer readable program instructions may be processed entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may process the computer readable program instructions by utilizing state information of the computer readable program instructions to personalize the electronic circuitry, in order to perform aspects of the system and method for enabling telecommunications and generating metrics of job provider responsiveness to subsequent job seeker calls to the job provider.

Aspects of the present system and method are described herein with reference to flowchart illustrations and/or block diagrams of methods, apparatus (systems), and computer program products according to embodiments of the system and method. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a special purpose machine, such that the instructions, which are processed via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps, also referred to herein as operations, to be performed on the computer, other programmable apparatus or other device to produce a computer implemented process, such that the instructions which are processed on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present system and method. In this regard, each block in the flowchart or block diagrams may represent a module, segment, or portion of instructions, which comprises one or more performable instructions for implementing the specified logical function(s). In some alternative implementations, the functions noted in the blocks may occur out of the order noted in the Figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or processing program code will include at least one processor coupled directly or indirectly to memory elements through a system bus. The memory elements can include local memory employed during actual processing of the program code, bulk storage media, and cache memories, which provide temporary storage of at least some program code in order to reduce the number of times code must be retrieved from bulk storage media during processing.

A data processing system may act as a server data processing system or a client data processing system. Server and client data processing systems may include data storage media that are computer usable, such as being computer readable. A data storage medium associated with a server data processing system may contain computer usable code such as for enabling telecommunications regarding posted jobs between job providers and job seekers including generating metrics of job provider responsiveness to subsequent job seeker calls to the job provider. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The descriptions of the various embodiments of the present system and method have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments and is not intended to be limiting of the system and method. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step/operation plus function elements in the claims below are intended to include any structure, material, or act for performing the function in combination with other claimed elements as specifically claimed. The description of the present system and method has been presented for purposes of illustration and description but is not intended to be exhaustive or limited to the system and method for enabling telecommunications including generating metrics of job provider responsiveness to subsequent job seeker calls to the job provider in the form disclosed. Many modifications and variations will be apparent to those of ordinary skill in the art. The embodiment was chosen and described in order to explain the principles of the system and method and the practical application, and to enable others of ordinary skill in the art to understand the system and method for various embodiments with various modifications as are suited to the particular use contemplated.

What is claimed is:

1. A method, comprising:
generating, at a job search intermediary system that hosts job postings, a virtual telephone address for a job posting identifying an initial telephone address and a forwarding map indicating to automatically forward voice over internet protocol (VOIP) calls for the virtual telephone address to the initial telephone address, wherein the virtual telephone address replaces the initial telephone address within the job posting;
receiving, at the job search intermediary system via an internet network and from a telecommunication provider system external to the job search intermediary system, first packet data indicating that a job seeker device initiated a VOIP call to the virtual telephone address, wherein the telecommunication provider system facilitates the VOIP call;
determining, at the job search intermediary system based on the first packet data, to forward the VOIP call to the initial telephone address using the forwarding map;
causing the telecommunication provider system to forward the VOIP call to the initial telephone address by transmitting, from the job search intermediary system via the internet network and based on the determination to forward the VOIP call to the initial telephone address, second packet data indicating to forward the VOIP call to the initial telephone address;
monitoring, at the job search intermediary system based on the forwarding of the VOIP call to the initial telephone address, third packet data associated with the VOIP call during the VOIP call to store call data representing the third packet data in a local call results queue of the job search intermediary system;
determining, at the job search intermediary system based on the call data stored within the local call results queue, a responsiveness score for the job posting and a job provider associated with the job posting; and
transmitting, from the job search intermediary system via the internet network, data indicative of the responsiveness score to a job provider device associated with the job provider.

2. The method of claim 1, further comprising:
providing the data indicative of the responsiveness score to a set of job seekers with the job posting.

3. The method of claim 1, further comprising:
utilizing the responsiveness score to modify a ranking of the job provider among a set of ranked job providers providing job postings; and
utilizing the ranking of the set of job providers to output a selected set of the provided job postings based on the ranking of the job providers.

4. The method of claim 1, further comprising:
receiving call metrics from the telecommunication provider system regarding a success and duration of subsequent calls made to the virtual telephone address.

5. The method of claim 4, wherein the responsiveness score is a running average of received call metrics.

6. The method of claim 1, further comprising:
outputting a number of calls made to the virtual telephone address with the responsiveness score.

7. The method of claim 1, wherein the job search intermediary system receives calls to the virtual telephone address and forwards the calls to the initial telephone address while detecting and storing metrics regarding the calls.

8. A system, comprising:
one or more processors; and
a memory, couple to the one or more processors, having stored therein for code is executable by the one or more processors to cause the one or more processors to perform operations comprising:
   generating, at a job search intermediary system that hosts job postings, a virtual telephone address for a job posting identifying an initial telephone address and a forwarding map indicating to automatically forward voice over internet protocol (VOIP) calls for the virtual telephone address to the initial telephone address, wherein the virtual telephone address replaces the initial telephone address within the job posting;
   receiving, at the job search intermediary system via an internet network and from a telecommunication provider system external to the job search intermediary system, first packet data indicating that a job seeker device initiated a VOIP call to the virtual telephone address, wherein the telecommunication provider system facilitates the VOIP call;
   determining, at the job search intermediary system based on the first packet data, to forward the VOIP call to the initial telephone address using the forwarding map;
   causing the telecommunication provider system to forward the VOIP call to the initial telephone address by transmitting, from the job search intermediary system via the internet network and based on the determination to forward the VOIP call to the initial telephone address, second packet data indicating to forward the VOIP call to the initial telephone address;
   monitoring, at the job search intermediary system based on the forwarding of the VOIP call to the initial telephone address, third packet data associated with the VOIP call during the VOIP call to store call data representing the third packet data in a local call results queue of the job search intermediary system;
   determining, at the job search intermediary system based on the call data stored within the local call results queue, a responsiveness score for the job posting and a job provider associated with the job posting; and
   transmitting, from the job search intermediary system via the internet network, data indicative of the responsiveness score to a job provider device associated with the job provider.

9. The system of claim 8, the operations further comprising:
   providing the data indicative of the responsiveness score to a set of job seekers with the job posting.

10. The system of claim 8, the operations further comprising:
   utilizing the responsiveness score to modify a ranking of the job provider among a set of ranked job providers providing job postings; and
   utilizing the ranking of the set of job providers to output a selected set of the provided job postings based on the ranking of the job providers.

11. The system of claim 8, the operations further comprising:
   receiving call metrics from the telecommunication provider system regarding a success and duration of subsequent calls made to the virtual telephone address.

12. The system of claim 11, wherein the responsiveness score is a running average of received call metrics.

13. The system of claim 8, the operations further comprising:
   outputting a number of calls made to the virtual telephone address with the responsiveness score.

14. The system of claim 8, wherein the job search intermediary system receives calls to the virtual telephone address and forwards the calls to the initial telephone address while detecting and storing metrics regarding the calls.

15. A non-transitory, computer readable medium having stored therein code is executable by one or more processors to cause the one or more processors to perform operations comprising:
   generating, at a job search intermediary system that hosts job postings, a virtual telephone address for a job posting identifying an initial telephone address and a forwarding map indicating to automatically forward voice over internet protocol (VOIP) calls for the virtual telephone address to the initial telephone address, wherein the virtual telephone address replaces the initial telephone address within the job posting;
   receiving, at the job search intermediary system via an internet network and from a telecommunication provider system external to the job search intermediary system, first packet data indicating that a job seeker device initiated a VOIP call to the virtual telephone address, wherein the telecommunication provider system facilitates the VOIP call;
   determining, at the job search intermediary system based on the first packet data, to forward the VOIP call to the initial telephone address using the forwarding map;
   causing the telecommunication provider system to forward the VOIP call to the initial telephone address by transmitting, from the job search intermediary system via the internet network and based on the determination to forward the VOIP call to the initial telephone address, second packet data indicating to forward the VOIP call to the initial telephone address;
   monitoring, at the job search intermediary system based on the forwarding of the VOIP call to the initial telephone address, third packet data associated with the VOIP call during the VOIP call to store call data representing the third packet data in a local call results queue of the job search intermediary system;
   determining, at the job search intermediary system based on the call data stored within the local call results queue, a responsiveness score for the job posting and a job provider associated with the job posting; and
   transmitting, from the job search intermediary system via the internet network, data indicative of the responsiveness score to a job provider device associated with the job provider.

16. The non-transitory, computer readable medium of claim 15, the operations further comprising:
   providing the responsiveness score to a set of job seekers with the job posting.

17. The non-transitory, computer readable medium of claim 15, the operations further comprising:
   utilizing the responsiveness score to modify a ranking of the job provider among a set of ranked job providers providing job postings; and
   utilizing the ranking of the set of job providers to output a selected set of the provided job postings based on the ranking of the job providers.

18. The non-transitory, computer readable medium of claim 15, the operations further comprising:
   receiving call metrics from the telecommunication provider system regarding a success and duration of subsequent calls made to the virtual telephone address.

19. The non-transitory, computer readable medium of claim 18, wherein the responsiveness score is a running average of received call metrics.

20. The non-transitory, computer readable medium of claim 15, the operations further comprising:
   outputting a number of calls made to the virtual telephone address with the responsiveness score.

21. The non-transitory, computer readable medium of claim 15, wherein the job search intermediary system receives calls to the virtual telephone address and forwards the calls to the initial telephone address while detecting and storing metrics regarding the calls.

* * * * *